United States Patent [19]

de Ruvo

[11] Patent Number: 4,737,238

[45] Date of Patent: Apr. 12, 1988

[54] METHOD OF PROCESSING WASTE PAPER WITH WHITE WATER AND ALUMINUM RECYCLE TO PAPERMILL

[75] Inventor: Alf R. de Ruvo, Sundsvall, Sweden

[73] Assignee: Sunds Defibrator Aktiebolag, Sweden

[21] Appl. No.: 78,523

[22] PCT Filed: Oct. 7, 1986

[86] PCT No.: PCT/SE86/00455

§ 371 Date: Apr. 23, 1987

§ 102(e) Date: Apr. 23, 1987

[87] PCT Pub. No.: WO87/03023

PCT Pub. Date: May 21, 1987

[30] Foreign Application Priority Data

Nov. 6, 1985 [SE] Sweden ................................ 8505228

[51] Int. Cl.$^4$ .......................... D21C 5/02; D21B 1/32; D21H 3/68

[52] U.S. Cl. ............................................ 162/4; 162/6; 162/29; 162/190; 162/181.2

[58] Field of Search ...................... 162/4, 5, 6, 29, 41, 162/190, 181.2, 181.5

[56] References Cited

U.S. PATENT DOCUMENTS

| | | | |
|---|---|---|---|
| 2,057,059 | 10/1936 | Rue | 162/190 |
| 4,115,188 | 9/1978 | O'Brien et al. | 162/190 |
| 4,416,727 | 11/1983 | Elton | 162/6 |
| 4,595,455 | 6/1986 | Mannbro | 162/65 |

FOREIGN PATENT DOCUMENTS

| | | | |
|---|---|---|---|
| 2610581 | 8/1977 | Fed. Rep. of Germany | 162/4 |
| 984182 | 2/1965 | United Kingdom | |

*Primary Examiner*—S. Leon Bashore
*Assistant Examiner*—K. M. Hastings
*Attorney, Agent, or Firm*—Lerner, David, Littenberg, Krumholz & Mentlik

[57] ABSTRACT

Processes for treating waste paper containing aluminum and having a high lignin content are disclosed, including producing an aqueous pulp suspension of the waste paper, screening the pulp suspension, dewatering the pulp so as to produce a first white water stream including most of the aluminum, delignifying the pulp suspension with oxygen, separating a portion of the aqueous liquid from the delignified pulp to produce a separated pulp stream and a second white water stream which is substantially free of aluminum, transferring the separated pulp to a paper mill, diluting the separated pulp stream with a dilution liquid stream in the paper mill, evaporating the second white water stream, and transferring at least a major part of the first white water stream to the paper mill for use as the dilution liquid therein.

7 Claims, 1 Drawing Sheet

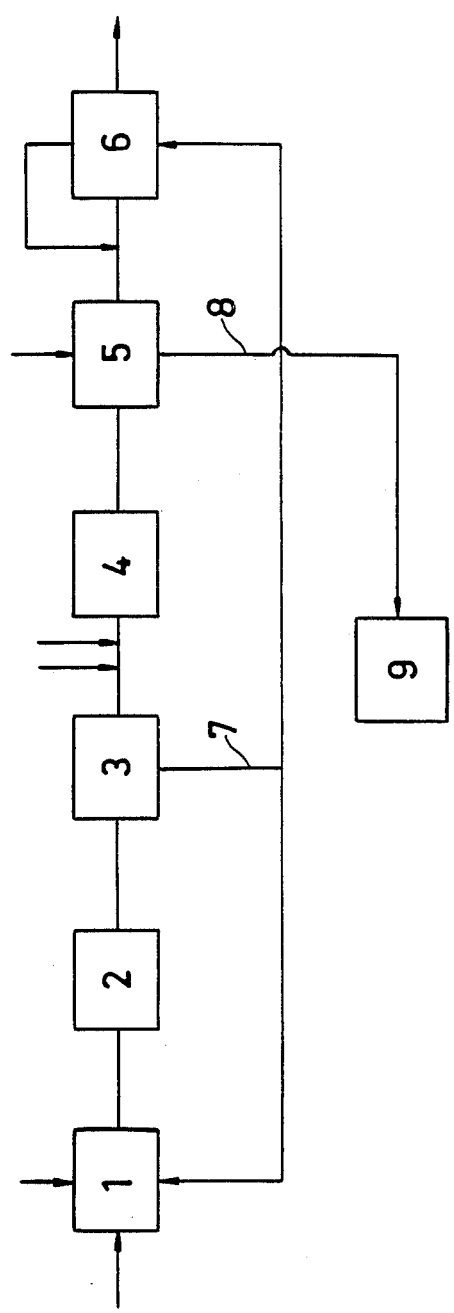

METHOD OF PROCESSING WASTE PAPER WITH WHITE WATER AND ALUMINUM RECYCLE TO PAPERMILL

FIELD OF THE INVENTION

The present invention relates to processes for the delignification of waste paper, particularly waste paper having a high lignin content. More particularly, the present invention relates to the delignification of waste paper, such as corrugated cardboard, which contains chemical high-yield pulp.

BACKGROUND OF THE INVENTION

Waste papers of the aforementioned types often contain aluminum in amounts of approximately 5 to 10 kg/ton of bone-dry pulp. This aluminum has usually been added in the form of alum as a retention agent during the prior papermaking process for these paper products. It is known that the presence of this aluminum creates problems of incrustation in evaporation plants. It is also known that magnesium compounds can be added thereto for the purpose of reducing these problems. Aluminum can thus be precipitated in the form of aluminum-magnesium compounds, and in this manner the amount of dissolved aluminum in the pulp suspension can be decreased.

In view of the relatively high aluminum content in these waste papers, however, such measures are generally not sufficient to make it possible to recycle white water from the delignification step to the evaporation plant. The presence of too great an amount of dissolved aluminum being returned to the evaporation step would in such a case give rise to the aforementioned incrustation problems.

It is desirable and necessary, however, to recycle the white water from the delignification step, particularly in view of the chemical and COD-content of the white water.

SUMMARY OF THE INVENTION

In accordance with the present invention, these and other objects have now been accomplished by the discovery of a process for treating waste paper containing aluminum and having a high lignin content in a method which restores to a certain extent the original properties of the fibers, particularly with respect to flexibility and the degree of swelling, without at the same time increasing the resistance to dewatering thereof. In particular, this process includes producing an aqueous pulp suspension of the waste paper containing aluminum by adding an aqueous solution to the waste paper, screening the aqueous pulp suspension so as to produce a screened aqueous pulp suspension, dewatering the screened aqueous pulp suspension so as to produce a concentrated aqueous pulp suspension and a first white water stream including substantially all of the aluminum from the waste paper, delignifying the concentrated aqueous pulp suspension so as to produce a delignified aqueous pulp suspension, separating a substantial portion of the aqueous liquid from the delignified aqueous pulp suspension so as to produce a separated pulp stream and a second white water stream substantially free of aluminum, transferring the separated pulp stream to a paper mill for the production of paper therefrom, diluting the separated pulp stream with a dilution liquid stream in the paper mill, evaporating the second white water stream, and transferring at least a major portion of the first white water stream to the paper mill for use as a dilution liquid stream therein.

In accordance with one embodiment of the process of the present invention, a portion of the first white water stream is utilized for producing the aqueous pulp suspension. In a preferred embodiment the screened aqueous pulp suspension has a concentration of about 1%.

In accordance with another embodiment of the process of the present invention, the process includes steam treating the concentrated aqueous pulp suspension produced in the dewatering step.

In a preferred embodiment the delignifying step is conducted in the presence of oxygen, and is preferably carried out at a pulp concentration of between about 10 and 12%.

In accordance with another embodiment of the process of the present invention, the process includes producing a third white water stream in the paper mill and recycling that third white water stream as a recycled dilution liquid stream for the separated pulp stream.

In short, by means of the present invention, after initial flushing and screening, oxygen delignification is carried out, and the pulp produced therein is subsequently transferred for papermaking. In particular, the pulp is dewatered prior to delignification so that the main portion of the white water can be directly transferred as dilution liquid in the paper mill, preferably for diluting the stock.

In this manner, substantially all of the dissolved aluminum can be removed from the pulp and transferred to the paper mill without being mixed into the recirculation system for the delignification step. It is therefore now possible to recycle water produced in the dewatering step following delignification to evaporation and chemical recovery with a minimum aluminum content.

BRIEF DESCRIPTION OF THE FIGURE

The present invention can be more fully appreciated with reference to the following detailed description, which in turn refers to the FIGURE in which there is shown a schematic flow diagram in accordance with the present invention.

DETAILED DESCRIPTION

Referring to the FIGURE, waste paper is charged into a pulper 1, and is finely distributed therein in order to produce a pulp, or an aqueous pulp suspension. During this dilution procedure a certain amount of NaOH can be added. The waste paper itself has a high lignin content, and preferably consists of corrugated cardboard produced from a chemical pulp having such a high lignin content. However, a mechanical pulp can also be used to a certain extent. After pulping in pulper 1, the pulp is cleaned in screens 2, wherein the pulp concentration is relatively low, such as about 1%.

Subsequent to screening, the pulp is then dewatered in a dewatering press 3, and it is then steam-treated. Alkali and oxygen are then added and intensively admixed therewith. The subsequent oxygen delignification step is then carried out in a pressurized reactor 4 at a pulp concentration of about 10 to 12% or lower. Subsequent to the delignification step a washing step is carried out in a washing press 5, from which the pulp is then transferred to a paper mill 6 for papermaking. In connection with this step the return fiber pulp is mixed with other pulps, such as unbleached kraft pulp for producing kraft liner, for example. It is naturally also possible to produce papers of other qualities, however. Additional bleaching and treatment of the return fiber pulp can then be carried out. By the aforesaid method, the properties of the returned fiber pulp are so improved that a greater amount of returned fibers can be used without deteriorating the properties of the final product.

In the process of this invention the white water is transported in the following manner. From the dewatering press 3 the main portion of the white water in line 7 is passed directly to the paper mill 6. A portion, however, of that white water in line 7 can be recycled for dilution in the pulper 1. The white water produced in the washing press 5 is directed through line 8 to evaporation and chemical recovery 9. Furthermore, white water from the paper mill 6 can be utilized for diluting the pulp after the washing press 5.

In accordance with this method the main portion of the dissolved aluminum is thus transferred via the white water flowing in line 7 to the paper mill 6, thus bypassing the oxygen delignification step. The aluminum contained in this white water stream, together with added alum, can thus serve as the retention agent in the papermaking process. The white water from the delignification step flowing in line 8, on the other hand, can be recycled to the recovery cycle. The aluminum content of the white water flowing in line 8 can therefore be maintained at such a low level that problems of incrustation in the evaporation plant no longer arise.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A process for treating waste paper containing aluminum comprising producing an aqueous pulp suspension of said waste paper by adding an aqueous solution to said waste paper, screening said aqueous pulp suspension so as to produce a screened aqueous pulp suspension, dewatering said screened aqueous pulp suspension so as to produce a concentrated aqueous pulp suspension and a first white water stream including substantially all of said aluminum, delignifying said concentrated aqueous pulp suspension so as to produce a delignified aqueous pulp suspension, separating a substantial portion of said aqueous liquid from said delignified aqueous pulp suspension so as to produce a separated pulp stream and a second white water stream substantially free of said aluminum, transferring said separated pulp stream to a paper mill for the production of paper therefrom, diluting said separated pulp stream with a dilution liquid stream in said paper mill, evaporating said second white water stream, and transferring at least a major portion of said first white water stream including substantially all of said aluminum to said paper mill for use as said dilution liquid stream therein and using said aluminum as a retention agent in the separated pulp stream.

2. The process of claim 1 including utilizing a portion of said first white water stream for producing said aqueous pulp suspension.

3. The process of claim 1 wherein said screened aqueous pulp suspension has a concentration of about one percent.

4. The process of claim 1 including steam treating said concentrated aqueous pulp suspension as produced in said dewatering step.

5. The process of claim 1 wherein said delignifying is carried out at a pulp concentration of between about 10 and 12 percent.

6. The process of claim 1 including producing a third white water stream in said paper mill and recycling said third white water stream as a recycled dilution liquid stream for said separated pulp stream.

7. The process of claim 1 wherein said delignifying is conducted in the presence of oxygen.

* * * * *